United States Patent [19]

Moran

[11] Patent Number: 5,091,258
[45] Date of Patent: Feb. 25, 1992

[54] LAMINATE FOR A SAFETY GLAZING

[75] Inventor: James R. Moran, Longmeadow, Mass.

[73] Assignee: Monsanto Company, St. Louis, Mo.

[21] Appl. No.: 569,332

[22] Filed: Aug. 20, 1990

[51] Int. Cl.$^5$ .............................................. B32B 17/10
[52] U.S. Cl. .................................. 428/437; 428/141; 428/458; 428/480; 428/524
[58] Field of Search ............... 428/141, 437, 458, 480, 428/524

[56] References Cited

U.S. PATENT DOCUMENTS

| | | | |
|---|---|---|---|
| 3,718,535 | 2/1973 | Armstrong et al. | 428/339 |
| 4,112,166 | 9/1978 | Chyu | 428/141 |
| 4,465,736 | 8/1984 | Nishihara et al. | 428/332 |
| 4,797,317 | 1/1989 | Oliver et al. | 428/204 |
| 4,855,186 | 8/1989 | Grolig et al. | 428/216 |
| 4,925,725 | 5/1990 | Endo et al. | 428/156 |

FOREIGN PATENT DOCUMENTS

0371949  6/1990  European Pat. Off. .
61-52093 11/1986  Japan .

Primary Examiner—Merrell C. Cashion, Jr.
Assistant Examiner—D. S. Nakarani
Attorney, Agent, or Firm—Michael J. Murphy; William J. Farrington

[57] ABSTRACT

A laminate which is substantially free of distortion when used in a safety glazing comprising a transparent, thermoplastic substrate layer, optionally surface treated or coated to improve adhesion, bearing one or more functional performance layers, such as an infra-red radiation reflecting stack, and at least one layer of plasticized polyvinyl butyral bonded on one side to a functional performance layer or the substrate layer having a roughened deairing surface on its other side characterized by a roughness value, Rz, of at least 10 micrometers, such plasticized polyvinyl butyral layer, before bonding to the substrate layer or functional performance layer, possessing low surface waviness on each side characterized by a wave index value, WI, of less than 15,000 square micrometers.

17 Claims, 5 Drawing Sheets

LAMINATE FOR A SAFETY GLAZING

BACKGROUND OF THE INVENTION

This invention relates to a laminate for a safety glazing and more particularly to reducing optical defects in such a glazing containing such a laminate.

Angstrom-thick (or thicker) layers of metals, metal compounds and the like in windows to reflect heat-producing infra-red solar radiation while transmitting significant cooler visible light are well known. Temperature increase is reduced within an area delimited by one or more of such windows. These layers usually arranged in sequence as stacks are carried by an appropriate transparent planar substrate such as biaxially stretched, thermoplastic polyethylene terephthalate film (PET) or equivalent material (hereinafter occasionally collectively called "metallized film"). One form known as an interference filter comprises at least one layer of reflective metal sandwiched between reflection-suppressing or anti-reflective dielectric layers. Likewise known is heating the metal layer by electrical conductance to provide defrost or deice and/or defog capability.

When a metallized film such as an interference filter is combined with glass in a laminated safety glazing, for example in a vehicle windshield, a shock-dissipating interlayer of plasticized polyvinyl butyral (PVB) is usually included to absorb a blow from the head of an occupant within the vehicle or from a foreign object from outside the vehicle without penetrating the windshield. As disclosed in U.S. Pat. No. 4,782,216, col. 3, lines 44-56, in a preferred structure a metal/dielectric stack on a flexible, transparent film substrate such as PET is encapsulated within two layers of plasticized PVB, one layer against the substrate and the other against the interference filter. This multi-layered laminate with PVB as the outer layers is then laminated between two rigid transparent members such as glass to form the safety glazing which, by virtue of the presence of the interference filter, controls solar radiation transmission.

A persistent optical quality defect particularly noticeable at oblique viewing angles can occur in such safety glazings as a visually apparent, isotropic, wave-like reflected image estimated to have an amplitude of about 0.1 to 0.5 mils and a wavelength of 100-300 mils. When pronounced, this defect renders the glazing commercially unacceptable. It is referred to hereinafter by the term "applesauce".

As disclosed in commonly owned, copending U.S. application Ser. No. 07/278,576, filed Dec. 1, 1988, by carefully designing the interference filter to minimize visible reflectivity at the PVB/metallized film interface and providing a neutral or green (vs red) color, the severity of this applesauce defect is reduced but not eliminated and frequently not reliably reduced to an acceptable level. While moderately successful, these approaches are cosmetic in reducing the visibility of but not dealing with or eliminating the applesauce optical defect per se.

Another attempt to deal with this optical defect is described in U.S. Pat. No. 4,465,736 where a solar reflecting metal/dielectric stack, therein called a coating, is on a special substrate designed to be heat shrinkable within certain carefully prechosen limits. The problem with this is the potential for unequal thermal shrinkage of the substrate and coating thereon, which can cause the coating to become discontinuous. Discontinuities in the coating can result in degradation in both electrical (i.e. higher resistance) and optical properties (i.e. an increase in the scattering of visible light). Moreover, according to this '736 patent, commercially available PVB sheet seemingly must first be specially heat treated before use with the metallized film.

Rather than mask the applesauce defect in a safety glazing, it would be desirable to eliminate it altogether or at least significantly reduce its severity.

SUMMARY OF THE INVENTION

Now improvements have been made in laminates containing high performance layer(s) for use in safety glazings such as vehicle windows and the like.

Accordingly, a principal object of this invention is to determine the mechanism causing reflected distortion visible as an optical defect called "applesauce" in a safety glazing containing a performance layer such as a solar reflecting metal/dielectric stack.

Having determined such mechanism, another object is to substantially reduce or eliminate such visible reflected distortion rather than to mask its presence.

A further object is to provide a laminate usable in safety glazings having improved optical performance insofar as displaying reduced or no reflected distortion.

A specific object is to provide such an improved safety glazing with reduced reflected distortion using PVB sheet as made on a commercial sheet extrusion line without requiring further processing before combining it in a laminate with metallized film.

Other objects will in part be obvious and will in part appear from the following detailed description and claims.

These and other objects are accomplished, initially, by determining that the optical defect resulting in reflected distortion and appearing as applesauce in a finished safety glazing, which includes a performance layer on a substrate, is caused by non-planarity of the plasticized PVB/coated substrate interface, such non-planarity being associated with the quality of the surface of the PVB layer. More specifically, applesauce appears when the PVB layer has an undulating surface topography characterized by a wave index (WI) (further explained hereinafter) greater than 15,000 square micrometers. Having determined the cause of the problem, the invention substantially reduces or eliminates applesauce by providing, as one or more layers in a laminate for such a safety glazing, a plasticized PVB sheet where each sheet surface has a WI less than 15,000 square micrometers and, preferably less than 12,000 square micrometers, yet one and preferably both such surfaces is textured or roughened to facilitate deairing, as characterized by a roughness value ($R_Z$) of at least 10 micrometers ($\mu$m).

Reflecting the foregoing, further provided is a laminate substantially free of reflected distortion when used in a safety glazing comprising a transparent, thermoplastic substrate layer, optionally surface treated or coated, bearing one or more functional performance layers and at least one layer of plasticized polyvinyl butyral bonded on one side to a functional performance layer or the substrate layer and having a roughened deairing surface on its other side characterized by a roughness value, $R_Z$, of at least 10 micrometers, such plasticized polyvinyl butyral layer, before bonding to the substrate layer or functional performance layer, possessinq low surface waviness on each side characterized by a wave index value, WI, of less than 15,000 square micrometers.

Also provided as a preferred embodiment is a laminate substantially free of reflected distortion when used in a safety glazing comprising two layers of plasticized polyvinyl butyral and an intermediate layer of metallized plastic film interposed therebetween, each plasticized polyvinyl butyral layer having i) an exposed deairing surface characterized by a roughness value, $R_Z$, of at least 10 micrometers and ii) before inclusion in the laminate, another deairing surface opposite the exposed surface also characterized by a roughness value, $R_Z$, of at least 10 micrometers and surface waviness on each side characterized by a wave index value, WI, of less than 15,000 square micrometers preferably less than 12,000 square micrometers.

BRIEF DESCRIPTION OF THE DRAWINGS

In describing the overall invention, reference will be made to the accompanying drawings wherein.

DETAILED DESCRIPTION OF ILLUSTRATED EMBODIMENTS

Figure 1:
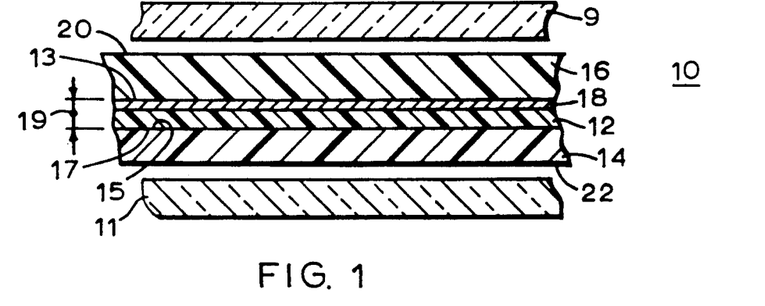
FIG. 1 is a partial, sectional view in enlarged detail of a laminate according to the invention shown in spaced association with glass layers of a safety glazing.

Referring to the drawings, laminate 10 is shown in FIG. 1 for use with one or more rigid transparent layers, such as, glass sheets 9, 11 in an optically transparent safety glazing for controlling solar radiation, which is substantially free of reflected distortion, such as the optical defect called applesauce. In the embodiment of FIG. 1, a safety glazing comprises laminate 10 firmly bonded to opposing glass sheets 9, 11, which for clarity are shown spaced from laminate 10.

Laminate 10 comprises a flexible plastic substrate layer such as film 12 having a thickness of about 0.5 to 8 mils (0.013 to 0.20 mm), preferably 1 to 4 mils (0.025 to 0.1 mm) and most preferably 2 mils (0.05 mm). Film 12 may optionally be surface treated or coated to improve one or more properties such as adhesion. The carrier surface of layer 12 (facing upwardly in FIG. 1) bears one or more functional performance layers, schematically shown as 18, such as a multi-layer stack for reflecting infra-red solar radiation and transmitting visible light when exposed to sunlight in a safety glazing. Stack 18 is known in the art (see, for example, International Publication WO 88/01230 and U.S. Pat. No. 4,799,745, the contents of which are incorporated herein by reference) and comprises one or more Angstroms-thick metal layers and one or more (for example two) sequentially deposited, optically cooperating dielectric layers. As also known, (see, for example, U.S. Pat. Nos. 4,017,661 and 4,786,783, the contents of which are also incorporated herein by reference), though not shown, the metal layer(s) may optionally be electrically resistance heated for defrosting or defoqging of the associated glass layers in the safety glazing. Metallized film 19 comprises substrate layer 12 and stack 18 and is sometimes hereinafter called "coated film".

In the embodiment shown, downside surface 17 of substrate layer 12 is bonded to the bonding surface of side 15 of at least one first, flexible transparent layer 14 of plasticized polyvinyl butyral, typically about 5 to 30 mils (0.13 to 0.76 mm) thick. As shown in FIG. 1, preferably the bonding surface of side 13 of a second flexible, transparent layer 16 of plasticized polyvinyl butyral is bonded to multi-layer stack 18. Layers 14, 16 may be the same or different thickness.

The surface quality of each side of layers 14, 16 is of primary concern in the invention.

Before bonding to form laminate 10, one or both sides of layers 14, 16 and/or substrate layer 12 and/or layer(s) of stack 18 may be surface treated or coated to improve one or more properties such as interfacial adhesion by, for example, flame or plasma exposure, sputter deposition of a metal oxide, application of an appropriate adhesive or the like.

Substrate layer 12 has properties to maintain its integrity during handling and deposition of stack 18 on its surface, as well as during subsequent bonding and laminating steps (to be further described) and as an integral part of the final safety glazing product. To satisfy such performance requirements, substrate layer 12 is optically transparent (i.e. objects adjacent one side of the layer can be comfortably seen by the eye of a particular observer looking through the layer from the other side) and usually has a greater, preferably significantly greater, tensile modulus regardless of composition than that of plasticized polyvinyl butyral layers 14, 16. Among thermoplastic materials having these physical properties, and therefore suitable as substrate layer 12, are nylons, polyurethanes, acrylics, polycarbonates, polyolefins such as polypropylene, cellulose acetates and triacetates, vinyl chloride polymers and copolymers and the like. Preferred materials are re-stretched thermoplastic films having the noted properties which include polyesters. Most preferred is polyethylene terephthalate (PET) which has been biaxially stretched to improve strength and which has been heat stabilized to provide low shrinkage characteristics when subjected to elevated temperatures (i.e. less than 2% shrinkage in both directions after 30 min. at 150° C.). The tensile modulus (at 21°-25° C.) of polyethylene terephthalate is about $10^{10}$ Pa as compared with about $10^7$ Pa for plasticized polyvinyl butyral of the type used in safety glazings. To facilitate bonding of various disparate layers usable in laminate 10, or for some other functional purpose, more than one identical or different coated or uncoated substrate layer 12 may be present in laminate 10. Various coating and surface treatment techniques for PET film are disclosed in published European Application No. 0157030, pages 4 and 5, incorporated herein by reference.

At least the surfaces of unbonded sides 22, 20 of PVB layers 14, 16 of laminate 10 opposite those of sides 15 and 13 which are associated with coated film 19, and preferably, before bonding, the surfaces of sides 15, and 13 of layers 14, 16 as well, have a certain degree of roughness, not shown, to facilitate deairing. More specifically, channels between the smooth surfaces of glass sheets 9, 11 (or the substrate layer or performance layer in forming laminate 10) and the extremities of minute valleys of the rough surface of opposing layer(s) 14, 16, permit air between the two members to escape when pressure or vacuum is applied to the interface. Such roughness should not be too low to avoid prematurely closing down the air evacuation channels causing the edges of layers 14, 16 to seal to the opposite laminating member before deairing is complete. For adequate deairing, at least sides 20, 22, and preferably also sides 15 and 13 of layers 14, 16, should have a roughened deairing surface characterized by a roughness value, $R_Z$, measured as hereinafter described, of at least 10 micrometers ($\mu$m).

As an essential aspect of the invention and the means for avoiding or significantly reducing the applesauce optical defect in a safety glazing incorporating laminate 10, in addition to the roughened deairing surface just described, before bonding to substrate layer 12 or metal stack 18, plasticized PVB layer 14, and, when used, 16 as well, has on each side 13, 20 and 15, 22, low surface waviness characterized by a wave index value (WI) of less than 15,000 square micrometers as measured and further described hereinafter. WI is preferably less than 12,000 square micrometers and most preferably less than 7,000 square micrometer. Hitherto PVB layer surface waviness was not of concern in forming conventional three layer glass/PVB/glass glazings since any such waviness or surface irregularities were eliminated in the same manner as the initially rough deairing surfaces when the PVB plastic melted and leveled during high temperature autoclave formation of the transparent safety glazing However, in accordance with the invention, to avoid applesauce-like optical defects in safety glazings made using, instead of a single PVB layer, a laminate which includes one or more high performance layers on a substrate layer, such surface waviness must be recognized and held below a certain level.

The PVB resin of layers 14, 16 has a weight average molecular weight greater than 100,000, preferably from about 200,000 to 300,000, as measured by size exclusion chromatography using low angle laser light scattering. Such PVB comprises, on a weight basis, 15 to 25%, preferably 18 to 22% hydroxyl groups calculated as polyvinyl alcohol (PVOH); 0 to 10%, preferably 0 to 3% residual ester groups, calculated as polyvinyl ester, e.g. acetate, with the balance being butyraldehyde acetal.

The resin of layers 14,16 must contain plasticizer and the amount depends on the specific PVB resin and the properties desired in the application. Usable plasticizers are well known and disclosed in U.S. Pat. No. 4,902,464, col. 5, lines 11-21, the content of which is incorporated herein by reference. Generally between 15 to 50, preferably 25 to 40 parts plasticizer per 100 parts of PVB resin are used.

PVB resin is produced by aqueous or solvent acetalization wherein PVOH is reacted with butyraldehyde in the presence of acid catalyst to produce PVB, followed by neutralization of the catalyst, separation, stabilization and drying of the PVB resin. It is commercially available from Monsanto Company as Butvar ® resin.

Plasticized PVB sheet is formed by initially mixing PVB resin with plasticizer (and optional, additional, well-known property-enhancing additives) and then extruding the formulation through a sheet-shaping die, i.e. forcing molten, plasticized PVB through a horizontally long, vertically narrow die opening substantially conforming in length and width to that of the sheet being formed. Rough surfaces on one or both sides of the extruding sheet are provided by the design of the die opening and the temperature of the die exit surfaces through which the extrudate passes. Alternative techniques for producing a rough surface on an extruding PVB sheet involve the specification and control of one or more of polymer molecular weight distribution, water content and melt temperature. Such techniques are disclosed in U.S. Pat. Nos. 2,904,844; 2,909,810; 3,994,654; 4,575,540 and European Patent No. 0185,863. As is known, this rough surface is only temporary and particularly functions to facilitate deairing during laminating after which it is melted smooth from the elevated temperature and pressure associated with autoclaving.

Figure 2:
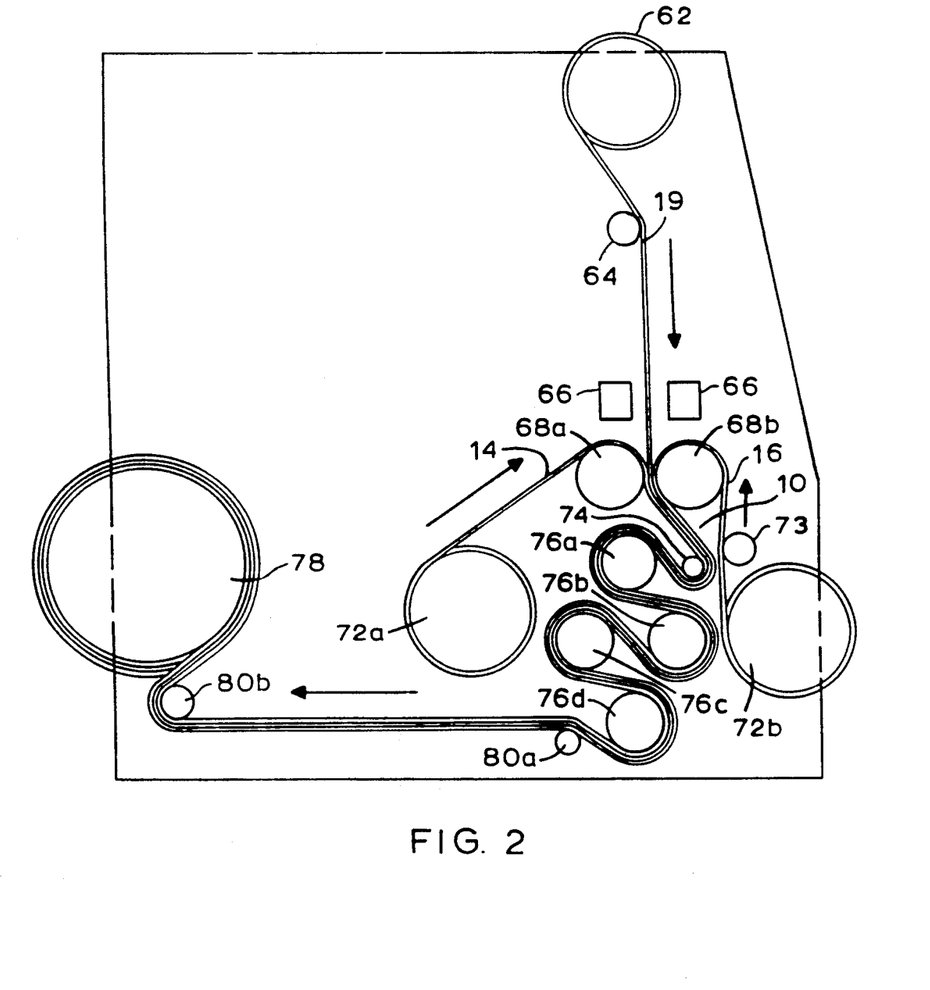
FIG. 2 is a schematic view of a representative apparatus for forming the laminate of FIG. 1.
Figure 3:
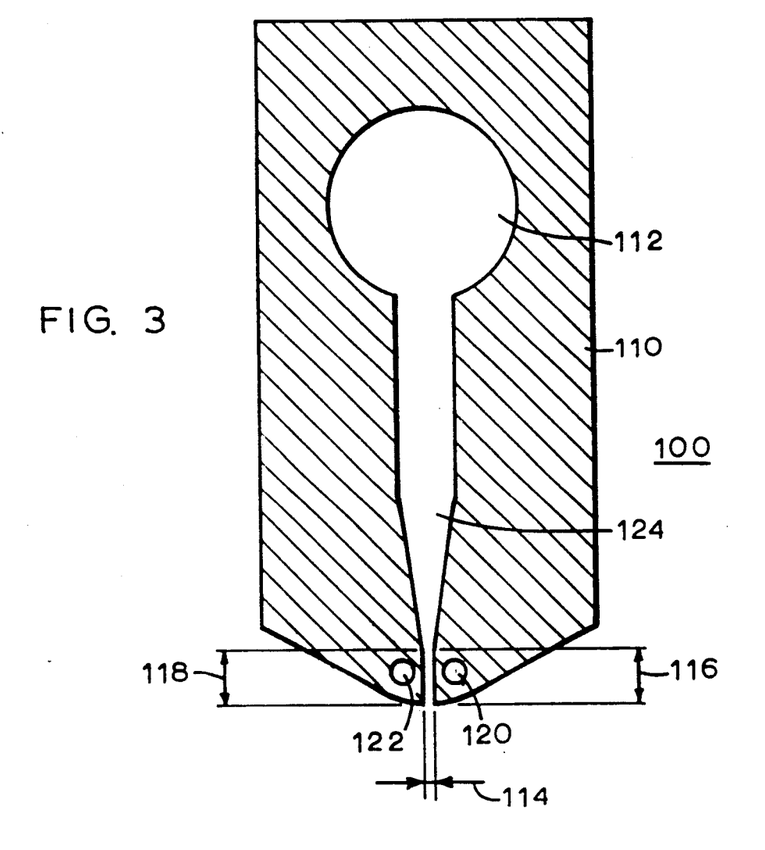
FIG. 3 is a partial, sectional view of a representative extrusion die for forming the PVB sheet components of the laminate of FIG. 1.

Referring to FIG. 2, a process will be described for forming laminate 10 for use in a safety glazing such as a vehicle or building window, skylight, sunroof or the like. FIG. 2 illustrates a nip roll press-bonding system for encapsulating coated film 19 within PVB layers 14, 16. Coated or metallized film 19 from roll 62 is passed over tension roll 64 and subjected to moderate surface heating in stations 66 positioned to gently heat either coated film 19, plasticized PVB sheets 14, 16 or both. Heating is to a temperature sufficient to promote temporary fusion bonding in that the thermally softened surfaces of layers 14, 16 become tacky. When the substrate layer of coated film 19 is the preferred biaxially oriented polyethylene terephthalate, suitable temperatures are from 30° to 120° C., with the preferred surface temperature reaching about 50° C.

Coated film 19 and layers 14, 16 having roughened deairing surfaces are directed into the laminating nip between oppositely rotating press rolls 68a, 68b where the three layers are merged together to expel air and encapsulate coated film 19 within PVB layers 14, 16 to form the lightly bonded laminate 10 of FIG. 1, without flattening the outer unbonded deairing surfaces of layers 14, 16. Layers 14, 16 are supplied from rolls 72a, 72b and a tension roll 73 can be included in the PVB layer supply line. If desired, press rolls 68a, 68b can be optionally heated to promote bonding. Bonding pressure exerted by press rolls 68a, 68b can be varied depending on the carrier film material chosen and bonding temperature employed but generally will range from about 0.7 to 5 kg/sq cm, preferably about 1.8-2.1 kg/sq cm. The tension of laminate 10 is controlled by passage over idler roll 74. Typical line speeds through the FIG. 2 assembly are from 5 to 30 ft/min (1.5 to 9.2 m/min).

Pursuant recognition by this invention, during bonding as just described, and potentially during subsequent autoclave lamination of the safety glazing to be further described, any coarse surface topography of one or both sides of the PVB layer(s) will be embossed onto and deform the smooth substrate layer of the coated film. This coarse surface topography characterized herein by wave index value is contrasted with the finer, shorter wavelength roughness referred to above which is normally present in PVB layer surfaces for deairing and which is not impressed on the substrate layer. In other words, as wavelength and amplitude of the PVB layer(s) surface topography decrease, the substrate layer is less subject to deformation or embossment. Unless layers 14, 16 have low surface waviness as previously described, the coated film/PVB interface will be non-planar to cause the applesauce optical defect sought to be avoided in the finished safety glazing. Such defect is reduced or eliminated by minimizing waviness on both sides of layers 14, 16 according to the invention.

Severity of embossment of the carrier film of the PVB sheet surface topography waviness is also a function of carrier film thickness. Within limits, embossment is reduced as carrier film stiffness is increased by increasing its thickness. For acceptable quality safety glazings (i.e. without excessive visually observable applesauce) WI of the PVB layers (measured as hereafter described) cannot be greater than 15,000 square micrometers regardless of carrier film thickness. Over the preferred carrier film thickness range of 1 to 8 mils (0.025 to 0.20 mm), for 1 to 3 mil thicknesses WI should be less than 12,000 square micrometers and at 4 to 8 mils, WI should be less than 12,000 square micrometers.

After bonding between press rolls 68a, 68b, laminate 10 passes over a series of cooling rolls 76a, 76b, 76c, 76d to insure that the laminate accumulation on roll 78 is not tacky. Process water cooling is generally sufficient to achieve this. The layers on roll 78 may optionally be interleaved with polyethylene film to minimize roll blocking. Tension in the roll system is maintained by idler rolls 80a and 80b. Bond strength at the contacting faces of the layers of laminate 10 is about 2–6 Newtons per linear cm when tested according to a standard 180° peel test. This is considered sufficient strength to avoid delaminating during normal handling and further processing of laminate 10.

The following procedures were used to obtain values for the various properties presented in Examples following.

A) Roughness ($R_Z$). A 15 cm by 15 cm test sample of plasticized PVB sheet is placed on a vacuum plate regulated by circulating fluid at room temperature through it. A vacuum of 25 in (64 cm) Hg is imposed to draw the sample against the plate surface. A model C5D Perthometer with a PPK drive unit and an RHT6/250 tracing stylus from Mahr Gage Co., N.Y. is used to directly measure sheet surface roughness (Profile selection "R" on the instrument) of each side of the test sample by moving the tracing stylus across the sample surface. The average value of individual roughness depths in five sequential measuring lengths $L_e$ of 2.5 mm is determined and $R_Z$ is the average of four such determinations, two taken in the machine direction of extrusion (MD) and two in the cross machine direction (CMD). In this roughness mode, the longer wave length irregularities are filtered out via the internal electronic circuitry of the Perthometer and only the very fine individual minute craters in the surface profile are measured.

B) Waviness Index (WI). Using the Perthometer referred to above, the waviness profile setting "W" is selected which, in contrast to the "R" setting, electronically filters out the very fine, shorter wave length roughness element normally measured in a standard surface roughness test, leaving the longer wave length overall surface contour for reproduction on the trace. Waviness is measured on each side of the test sample. Using an analog output from a plug connection in the back of the Mahr Perthometer, the variable waviness output voltage signal from the Perthometer is electronically fed through an analog to digital adapter board to an IBM PC computer equipped with a program to compute WI. The program is a smoothing program which applies a set of smoothing rules to the measured waviness profile and develops a smoothed trace which ignores minor slope changes as not true inflection points. In this regard, considering the waviness profile as a series of peaks and valleys, the smoothing rules of the program consider an inflection point to be a true peak or valley if it is: i) at least 100 micrometers away from the immediately preceding prior peak or valley and ii) at least 0.5 micrometer above or below the immediately preceding prior peak or valley, a valley being at least 0.5 micrometer below the immediately preceding prior peak. Pitch (P) is the distance between one valley and the next valley or in other words across the base of a peak. Average amplitude ($H_{avg}$) and average pitch ($P_{avg}$) are determined by the program for the smoothed trace of ten 12.5 mm tracing lengths (the second five lengths being 90° to the first five lengths). From the average of the averaged H's and P's, a WI value is computed from the equation: Wave Index (WI)=($H_{avg}$)×($P_{avg}$) where $H_{avg}$ and $P_{avg}$ are in microns.

Using the above-noted Perthometer, other set-up switch positions for both roughness and waviness are as follows:

Horizontal magnification 500
Parameter Selection RtPtWt
Tracing length 15/2.5
Vertical magnification 2.5

The invention is further described with reference to the following Examples which are not intended to limit or restrict the invention. Unless otherwise indicated, all quantities are expressed in weight.

EXAMPLE 1

Preparation Of PVB Sheet

Figure 10:
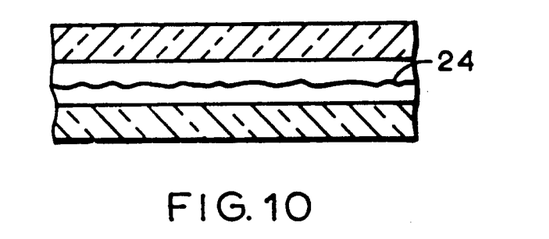
FIG. 10 is a view similar to FIG. 1 schematically illustrating the cause of an applesauce optical defect.

Polyvinyl butyral prepared by solvent acetalization of polyvinyl alcohol (PVOH) with butyraldehyde, available from Monsanto Company as BUTVAR® resin, which had a residual hydroxyl content of 18.2% (calculated as polyvinyl alcohol) was blended in a high intensity mixer with 32 parts dihexyl adipate plasticizer per 100 parts PVB resin. The plasticized PVB resin was melted in a single screw (36/1 L/D) extruder and forced through a sheeting die such as shown as 100 in FIG. 10. With reference to FIG. 10, the melt entered die 100 through manifold 112 and exited in sheet form through rectangular slot 114 (0.0064 cm horizontal dimension) at the forward end of die body 110. Parallel die lips 116, 118 had 0.478 cm long smooth land surfaces. Oil at about 160° C. circulating through channels 120, 122 adjacent lips 116, 118 controlled the surface temperature of lips 116, 118. Melt pressure immediately upstream of tapered approach passage 124 was about 7992 kPa and melt temperature about 200°–205° C. Sheet issuing continuously from slot 114 into the surrounding air atmosphere at nominally 0.38 mm thickness was directed through a nearby water bath to cool and set the plastic.

Figure 4:
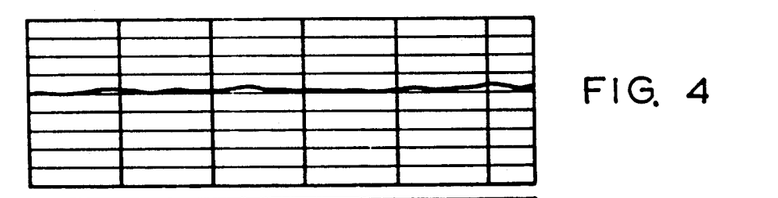
FIGS. 4-6 are plots of the surface topography of PVB sheet used in the laminate of FIG. 1.
Figure 5:
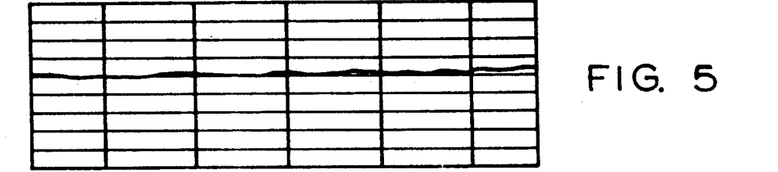
Figure 6:
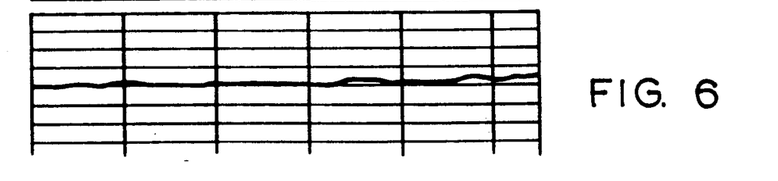
Figure 7:
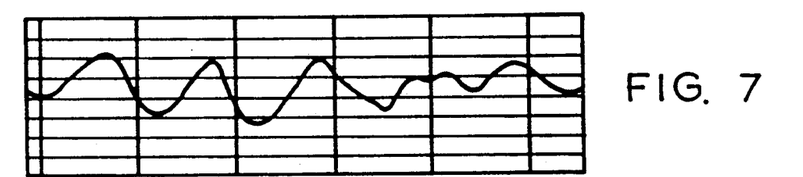
FIGS. 7-9 are similar to FIGS. 4-6 according to the prior art.
Figure 8:
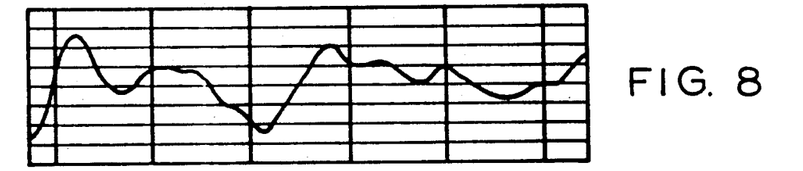
Figure 9:
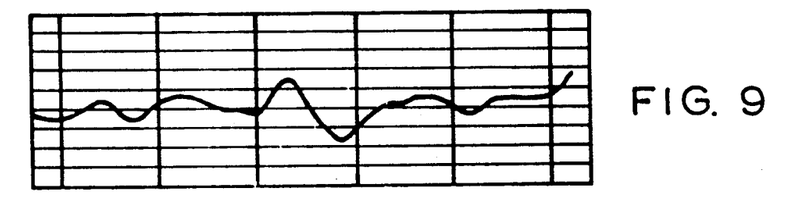

$R_Z$ values for each side of the extruded sheet were 12.7 μm. Typical Perthometer waviness tracings of three PVB sheet sections made as just described are illustrated in FIGS. 4, 5 and 6. FIGS. 4 and 6 were taken in the MD whereas FIG. 5 was in the CMD. Notable is the significant absence of surface waviness in contrast to the more undulant surface of Example C-1 as shown in FIGS. 7, 8 and 9 to be further described. Average amplitude ($H_{avg}$) for the sheet sections shown was 2.5 μm; average pitch ($P_{avg}$) was 2180 μm providing a WI of 5,500 square micrometers.

Preparation Of Laminate

A metallized film in the form of a flexible, transparent, thermoplastic substrate layer carrying a multilayer, solar radiation control stack was obtained from Southwall Technologies Inc. of Palo Alto, Calif. as HEAT MIRROR TM-XIR-70-2 coating. The substrate layer was 2 mil (0.051 mm) thick PET film from Hoechst Celanese Corp. as HOSTAPHAN ® 4400-200 film which had been biaxially oriented by stretching approximately equally in the longitudinal and transverse directions in the plane of the film and subsequently dimensionally stabilized by heating under tension to about 180°-230° C. for about 1 to 3 sec. The solar control stack was about 2000A thick and comprised five to seven successive, sputter-deposited alternate layers of silver metal and indium oxide dielectric material, further details of which are described in U.S. Pat. No. 4,799,745, incorporated herein by reference. As disclosed, for example in published Japanese Patent No. 60-228545, the side of the PET film without the stack was plasma treated using oxygen to improve the adhesive strength of the PET film.

Using the system of FIG. 2, the metallized film was encapsulated within and lightly bonded to two 0.38 mm thick layers of the plasticized polyvinyl butyral sheet prepared as noted above in this Example 1, without any further modification of surface or shrink properties of the PVB sheets, to form a laminate 10 as shown in FIG. 1.

Preparation of Safety Glazing

A pair of matching, full size float glass sheets shaped for use as a windshield in a 1990 model U.S. automobile were separated from each other and disposed in convex position. A flexible rectangular section of laminate 10 formed as noted above in this Example 1 containing plasticized PVB sheet characterized by the noted values was draped over one shaped glass sheet and then the other was placed on top to form a three layer prelaminate of glass/laminate/glass. Excess laminate overhanging the edges was trimmed off and an elastomeric vacuum ring was placed in sealing contact with the perimeter of the prelaminate. Negative pressure within the ring was reduced to 600 mm Hg and held for 5 min at ambient temperature to withdraw air from the glass/PVB sheet interfaces through the channels formed by the roughened deairing surfaces of each PVB sheet. The deaired prelaminate and functioning vacuum ring were placed in an oven at 85° C. for about 25 min. to seal the laminate edges to the glass. After removing the vacuum ring the assembly was held in an autoclave for two hours at 1275 kPa, 150° C. to firmly bond the PVB sheets of the laminate to the glass and form the automobile windshield safety glazing. After cooling to ambient temperature, the finished windshield was visually inspected for optical defects in the form of reflected image distortions. None were found anywhere in the windshield.

Figure 11:
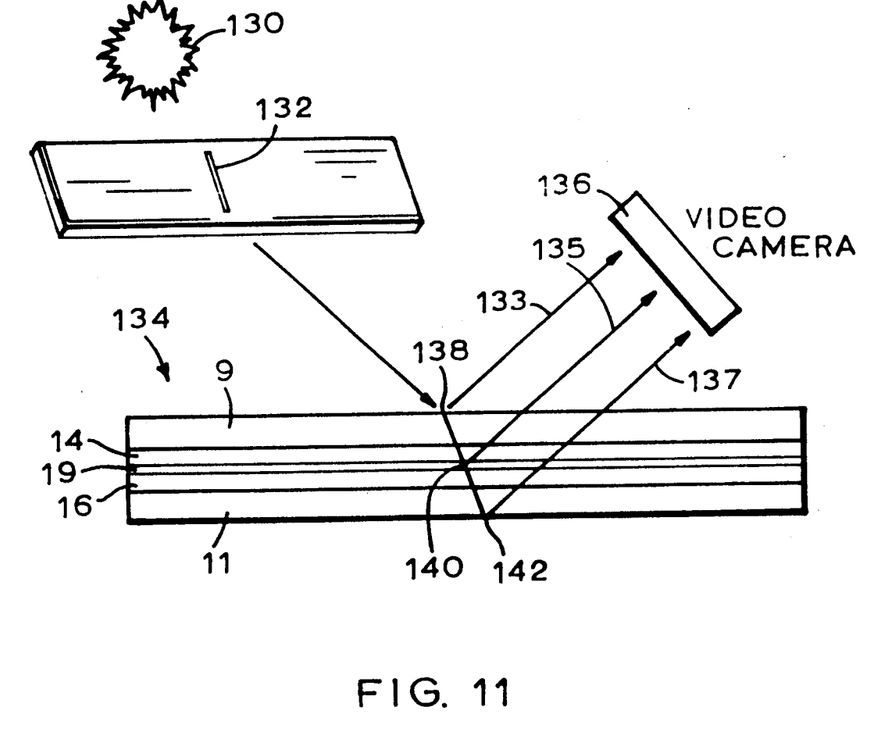
FIG. 11 is a schematic view of a system for measuring optical performance of safety glazing incorporating laminates such as shown in FIG. 1.
Figure 12:
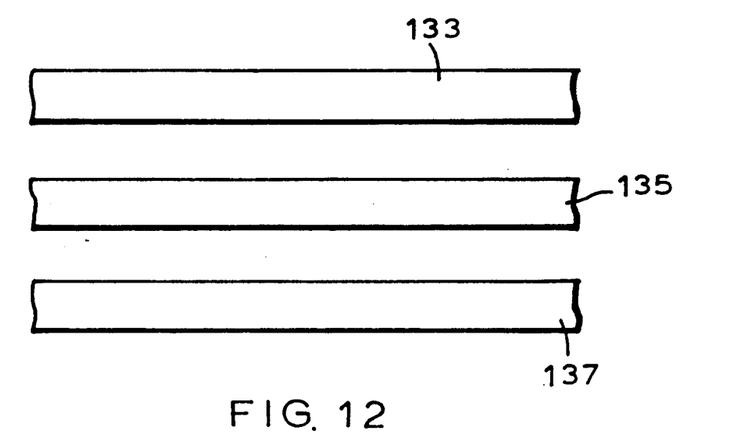
FIGS. 12 and 13 are views in enlarged detail illustrating specific results obtained using the system of FIG. 11.

To confirm the absence of reflected image distortions in these windshields and instrumentally physically depict the plane of engagement of the surfaces of the plasticized PVB layers with i) the PET carrier film and ii) the solar radiation control stack, the windshields were exposed to an optical imaging device as illustrated in FIG. 11. Light from source 130 was directed through slit opening 132 onto surface segments of windshield 134 (the components of which are numbered as in FIG. 1) and reflections 133; 135 and 137 of this light from various reflective interfaces of windshield 134 were captured by video camera 136. These reflective interfaces are shown in FIG. 11 as 138 at the air to top surface of glass layer 9; 140 as the combined interfaces of one PVB layer 14 with the PET layer of coated film 19 and the other PVB layer 16 with the solar control stack of film 19, and 142 at the air to bottom surface of glass layer 11. In this regard, when present, reflection from both sides of the metallized film contribute to the reflection distortion problem—i.e. The PVB sheet—solar stack interface and the PVB-PET interface. The images of these reflections in magnified form are substantially reproduced in FIG. 12 using the same identifying numbers as in FIG. 11. This data dramatically shows that the low surface waviness on each side of PVB layers 14, 16 is preserved in laminated safety glazing or windshield 134 and provides a substantially planar reflected image 135 at the plane of engagement of the PVB layers with the metallized film which is free of any significant distortion and therefore of the applesauce visual defect.

It should be noted that the ideal interface 140 in a finished safety glazing from which no reflected distortion at all will occur is truly optically flat, such as is the surface of a glass layer. However, gage thickness variations typically of about ±5% as generally encountered in commercial PVB layers and substrate films can be tolerated and need not be eliminated for successful use as laminate components in high performance safety glazings of the type herein described. Such long wavelength variations do not present unacceptable severe applesauce; large or rapid gage thickness changes such as typically shown in FIGS. 7-9, however, are to be avoided as producing unacceptable applesauce.

On the other hand, to accommodate the deairing function, the initial fine roughness, which is different from the coarser waviness being distinguished herein, is preferably present in the PVB layer surface(s) to be joined to the metallized film during nip roll processing. Without such roughness, i.e. using perfectly flat, smooth PVB layers, if not careful, trapped air can contribute to disruption of the PVB-metallized film interface(s) in the same manner as can the impressed wavy surface topography of PVB layers to eventually produce unacceptable applesauce in the finished safety glazing.

EXAMPLE C-1

This Example illustrates significant waviness in plasticized PVB sheet formed by a prior art die roll extrusion process, and the resulting applesauce-like optical defects it caused when used in a safety glazing laminate.

In the die roll extrusion process used, molten plasticized PVB resin of the same formulation as Example 1 issuing from an extruder was cast onto a specially prepared surface of an adjacent rotating die roll which essentially represented one side of the extrusion orifice. This die roll surface had been sand blasted and coated using the special techniques essentially described in U.S. Pat. No. 4,035,549, col. 3, line 56 through col. 4, line 44. This roll surface imparts the desired roughened deairing surface to one side of the extruding sheet and therefore the roll surface is considered essentially a negative of the sheet surface.

The other side of the extrusion orifice of this die roll system was delimited by a die blade as generally described in U.S. Pat. No. 4,112,166 and shown at 4a in FIG. 6. This die blade had a smooth, horizontal land surface about 0.3 cm long at its forward end which was temperature controlled by circulation of pressurized cooling water through a channel adjacent this land surface. The surface of the die roll was about 35° C. Melt temperature and pressure upstream of the die outlet were about the same as in Example 1.

The 0.38 mm thick sheet formed had an $R_Z$ on the die roll side of 32 μm and on the die blade side of 16.8 μm. In sharp contrast to FIGS. 4, 5 and 6 for Example 1, typical Perthometer waviness traces obtained are illustrated in FIGS. 7, 8 and 9 for three PVB sheet sections made as just described in this Example 2 which illustrate significant surface waviness. FIGS. 7 and 9 are MD and FIG. 8 is CMD. As shown, waviness extended in both directions which supports its isotropic description previously noted herein. $H_{avg}$ of these sheet sections was 10.2 μm; $P_{avg}$ was 2270 μm providing a WI of 23,200 square micrometers.

The identical procedure of Example 1 was followed in preparing laminates and full size vehicle windshield safety glazings using PVB sheet formed as noted above in this Example C-1 and having surface topographies as represented in FIGS. 7-9. When visually inspected for optical characteristics, significant reflected distortions were observed.

Figure 13:
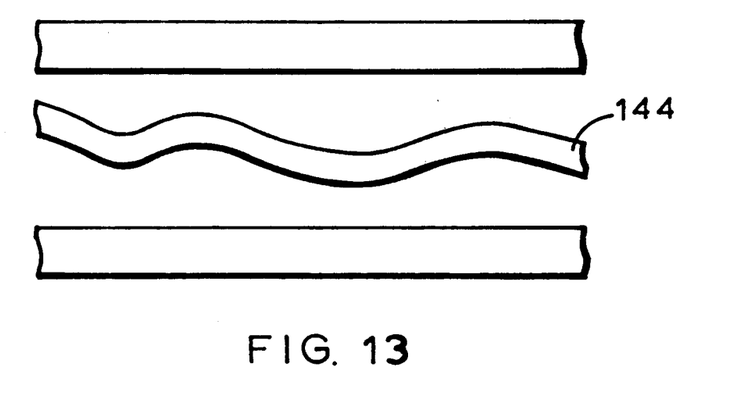

The cause of the pronounced reflected distortions visible as applesauce in this Example is illustrated in FIG. 10 where 24 schematically represents the collective non-planarity of the interfaces of the plasticized PVB layers with the surfaces of the metallized film. In confirmation of this, when windshields prepared in this Example C-1 were examined as in Example 1 using the system of FIG. 11, the reflected images shown in FIG. 13 were obtained. As apparent, non-planar, wavy image 144 of the combined interfaces of the two PVB layers with the surfaces of the metallized film simulate to a degree the related waviness of the PVB layer surfaces shown in FIGS. 7-9 and is responsible for the visually noted significant reflected distortions.

Though the invention has been so far described in the preferred context of use with a metallized film and specifically, an infra-red solar radiation reflective stack on a substrate layer, it is equally applicable to alternative performance layer(s) designed to provide other different enhanced use features in a safety glazing. Accordingly, the substrate layer broadly may support one or more functional performance layers or coatings (inclusively referred to as "layer(s)") which, alternative of the solar radiation reflecting stack described above can be: holographic layer(s) used as solar reflecting mirrors in head-up displays to facilitate viewing instruments on a vehicle dashboard while looking straight ahead; photochromic or electrochromic layer(s) which controllably change color on exposure to solar radiation or application of a voltage; layered protective antilacerative structures on the inboard side of a conventional three layer glass/PVB sheet/glass laminate to minimize lacerations from sharp edges of broken glass; special plastic layers in bilayer structures replacing one glass layer of such a three layer glass laminate, and similar other functional performance-enhancing layer(s).

The preceding description is for illustration only and is not to be taken in a limited sense. Various modification and alterations will be readily suggested to persons skilled in the art. It is intended, therefore, that the foregoing be considered as exemplary only and that the scope of the invention be ascertained from the following claims.

I claim:

1. A laminate which is substantially free of reflected distortion when used in a safety glazing comprising:
   a transparent, thermoplastic substrate layer, optionally surface treated or coated, bearing one or more functional performance layers; and
   at least one layer of plasticized polyvinyl butyral bonded on one side to a functional performance layer or the substrate layer and having a roughened deairing surface on its other side characterized by a roughness value, Rz, of at least 10 micrometers;
   said at least one plasticized polyvinyl butyral layer, before bonding to the substrate layer or functional performance layer, possessing low surface waviness on each side characterized by a wave index value, WI, of less than 15,000 square micrometers.

2. The laminate of claim 1 wherein the substrate layer is polyester film having a thickness of about 0.013 to 0.20 mm.

3. The laminate of claim 2 wherein the polyester is biaxially stretched polyethylene terephthalate.

4. The laminate of claim 3 wherein the biaxially stretched polyethylene terephthalate film bearing the one or more functional performance layers is encapsulated within and bonded to two layers of plasticized polyvinyl butyral, each of said layers of plasticized polyvinyl butyral having said roughened surface at least on one side and said low surface waviness on each side.

5. The laminate of claim 4 wherein the functional performance layers comprise an infra red radiation reflective stack.

6. The laminate of claim 5 wherein the infra red radiation reflective stack comprises one or more metal layers and one or more integral cooperating dielectric layers.

7. The laminate of any of claims 1, 2, 3, 4, 5 or 6 wherein WI is less than 12,000 square micrometers.

8. A laminate which is substantially free of reflected distortion when used in a safety glazing for controlling solar radiation comprising:
   a flexible, transparent, thermoplastic substrate layer, optionally treated or coated to improve adhesion, having a carrier surface and an opposite back surface;
   a multi-layer stack on the carrier surface for reflecting infra-red radiation and transmitting visible light comprising one or more metal layers and one or more cooperating dielectric layers, any of said metal or dielectric layers having been optionally surface modified or coated to improve one or more properties;
   a first, flexible layer of plasticized polyvinyl butyral having a bonding surface adhered to the back surface of the substrate layer;
   a second, flexible layer of plasticized polyvinyl butyral having a bonding surface adhered to the outermost layer of the multi-layer stack;
   each of said first and second polyvinyl butyral layers having opposite, unbonded, roughened deairing surfaces characterized by a roughness value, $R_Z$, of at least 10 micrometers; and
   each of said first and second polyvinyl butyral layers before bonding to the substrate layer and the stack possessing low surface waviness on each side characterized by a wave index value, WI, of less than 15,000 square micrometers.

9. The laminate of claim 8 wherein the substrate layer is a polyester film having a thickness of about 0.013 to 0.20 mm.

10. The laminate of claim 9 wherein the polyester is biaxially stretched polyethylene terephthalate.

11. The laminate of any of claims 8, 9 or 10 wherein WI is less than 12,000 square micrometers.

12. A laminate substantially free of reflected distortion when used in a safety glazing comprising two layers of plasticized polyvinyl butyral and an intermediate layer of metallized plastic film interposed therebetween, each plasticized polyvinyl butyral layer having i) an exposed deairing surface characterized by a roughness value, $R_Z$, of at least 10 micrometers and ii) before inclusion in the laminate, another deairing surface opposite the exposed surface also characterized by a roughness value, $R_Z$, of at least 10 micrometers and surface waviness on each side characterized by a wave index value, WI, less than 15,000 square micrometers.

13. The laminate of claim 12 wherein WI of each side of each plasticized polyvinyl butyral layer is less than 12.

14. The laminate of either of claims 12 or 13 wherein the plastic film is biaxially stretched polyethylene terephthalate.

15. The laminate of claim 14 wherein the plastic film is about 0.025 to 0.10 mm thick.

16. The laminate of any of claims 1, 8 or 12 wherein $WI = H_{avg} \times P_{avg}$, wherein $H_{avg}$ and $P_{avg}$, each measured in micrometers, are based on the surface profile of the sheet obtained using a Mahr C5D Perthometer with a waviness profile setting of W.

17. The laminate of claim 16 wherein the profile using said setting of W is obtained after electronically filtering out short wave-length segments measured in determining $R_Z$.

* * * * *